US006860806B2

(12) United States Patent
Kojima et al.

(10) Patent No.: US 6,860,806 B2
(45) Date of Patent: Mar. 1, 2005

(54) VIRTUAL HORSERACING SYSTEM

(75) Inventors: Akio Kojima, Tokyo (JP); Kazuo Ootake, Saitama (JP)

(73) Assignee: Teletech Co., Ltd., Tokyo (JP)

( * ) Notice: Subject to any disclaimer, the term of this patent is extended or adjusted under 35 U.S.C. 154(b) by 98 days.

(21) Appl. No.: 09/983,215

(22) Filed: Oct. 23, 2001

(65) Prior Publication Data

US 2003/0078087 A1 Apr. 24, 2003

(51) Int. Cl.[7] .......................... A63F 13/00; A63F 9/24; G06F 17/00; G06F 19/00

(52) U.S. Cl. .............................. 463/6; 463/40; 463/41; 463/42

(58) Field of Search ............................ 463/1–9, 40–42, 463/25; 700/90–93

(56) References Cited

U.S. PATENT DOCUMENTS 5,411,258 A * 5/1995 Wilson et al. ................. 463/6
5,714,997 A * 2/1998 Anderson .................... 348/39
6,080,063 A * 6/2000 Khosla ........................ 463/42
6,089,981 A * 7/2000 Brenner et al. ............... 463/40
6,155,927 A * 12/2000 Levasseur et al. ............ 463/42
6,292,706 B1 * 9/2001 Birch et al. .................... 700/91
6,537,149 B2 * 3/2003 Sogabe .......................... 463/1

* cited by examiner

*Primary Examiner*—Xuan M. Thai
*Assistant Examiner*—Robert Mendoza
(74) *Attorney, Agent, or Firm*—Reed Smith LLP; Stanley P. Fisher, Esq.; Juan Carlos A. Marquez, Esq.

(57) ABSTRACT

An object of the present invention is to provide a user even at a place away from a racecourse with computer graphic horses having existing past data therein, and also with real time data, and thereby a hitting ratio of simulated finishing orders of racing horses is drastically improved.

The racing horses to start a horse race are expressed by means of computer graphics, the existing past data associated with the racing horses is retrieved into the computer graphic horses, and a virtual horse race is started on a display screen, so that a finishing order of the horse race can be predicted according to an action and a result of the virtual horse race.

30 Claims, 16 Drawing Sheets

FIG. 5

| SYUKA 9 2 13 | 1600 | 1000 | 800 | 600 | 200 | | CONDITION AND SCORE | |
|---|---|---|---|---|---|---|---|---|
| ① ADMIRE | | | | | | | | |
| | | — | 38.9 | 24.9 | 12.2 | 1 | H | 6 |
| Assistant 28 Rittoh Good | | — | 52.7 | 38.7 | 13.8 | 1 | B | 7 |
| Assistant 3 Rittoh Fast | | — | 61.4 | 45.4 | 14.5 | 1 | H | 6 |
| Assistant 5 Rittoh Fast | | — | 56.4 | 39.9 | 12.5 | 1 | B | 6 |
| Assistant 10 Rittoh Soft | | — | 57.3 | 40.1 | 12.4 | 1 | B | 6 |
| ② | | | | | | | | |

FIG. 6
TOP RUNNING
TM OCEAN TAKES A QUICK ACTION AND A DEVASTATING TURN OF FOOT WHEN A JOCKEY LOOSENS THE REINS IN THE STRAIGHT LINE. IN THE HORSERACING GROUND OF THIS WEEK, THIS SPLENDID RUN IS OWING TO THE GREAT RUN IN THE MIDDLE PORTION. WELL TRAINED, HE GETS BETTER WITH AGE THAN THIS SPRING.

COLLECTING RATE

IT BOASTS OF HIGHER COLLECTING RATE.

FIG. 9

〈Payoff〉

| | | | |
|---|---|---|---|
| Win | 01 | ¥200 | First choice |
| Place | 01 | ¥110 | First choice |
| | 05 | ¥140 | Third choice |
| | 12 | ¥120 | Second choice |
| Quinella A | 1-5 | ¥460 | Second choice |
| Quinella B | 01- 05 | ¥500 | Second choice |
| Quinella place | 01-05 | ¥230 | Second choice |
| | 01-12 | ¥190 | First choice |
| | 05-12 | ¥310 | Forth choice |

FIG. 12

RECORD

THIRD TERM, KYOTO, 11R, APRIL 29, 2001
THE 123RD TENNO SHO (SPRING) (G1)

THROUGHBRED, FOUR YEAR OLD AND UPWARD 3200m TURF, CLOCKWISE, OUTSIDE TRACK
OPEN CLASS FIXED WEIGHT
PRIZE: 132MILLION, 53 MILLION, 33 MILLION, 20 MILLION, 13.2 MILLION YEN START 15:40
WEATHER: RAIN TURF: GOOD

| FINISHING PLACE | POST POSITION | HORSE NUMBER | SYMBOL | HORSE NAME | SEX | AGE | WEIGHT | JOCKEY | TIME | MAR-GIN | HORSE WEIGHT | | TRAINER | CHOICE |
|---|---|---|---|---|---|---|---|---|---|---|---|---|---|---|
| 1 | 1 | 1 | | | COLT | 5 | 58.0 | WADA | 3:16.2 | | 478KG | +2 | IWAMOTO | 1 |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |

Fractional time 12.5 – 11.8 – 10.9 – 11.1 – 12.0 – 12.1 – 12.0 – 13.8 – 12.7 – 13.6 – 12.9 – 12.5 – 12.4 – 11.7 – 11.9 – 12.3
Final 4F 48.3 – 3F 35.9

| | |
|---|---|
| 1 corner | 9,6-2=7(12,8)1(5,10)11,3,4 |
| 2 corner | (6,*9)-2=7,12,8,1(5,10)(3,11)4 |
| 3 corner (2) | 9,2-7,12,8,1,10,5(6,11)3,4 |
| 4 corner (2) | 7,12,2(1,8)(9,5,10)11,3,4=6 |

VIRTUAL HORSERACING SYSTEM

BACKGROUND OF THE INVENTION

1. Field of the Invention

The present invention relates to a method of simulating a finishing order in a horserace, in which the finishing order depends on speed of horses, before starting of the race, with use of various data.

2. Description of the Related Art

In a horserace, it is very interesting to not only race fans but also the other people to expect a result of a horserace on the basis of data given prior to the race. Furthermore, in order to improve a so-called "collecting rate", which is a ratio of total payback per total bet, everyone desires such information that can remarkably improve a probability of getting a right finishing order of starting horses, and is very interested in such information.

Hitherto, such kind of information is to be acquired from media such as TV broadcast, radio broadcast, newspaper or the Internet, and the information is usually available one day or at least half a day before a race.

However, upon predicting a finishing order of starting horses, among such kind of information, it is clear that information that is available on a real time basis such as wind direction, wind force, weather, information on a racetrack just before the race, and so-called paddock information including training results, physical conditions, mood, cheers of attendants, changes of jockeys and the like, gives very much importance, although it is necessary to go to a racecourse to obtain these information, and also it is very hard to obtain accurate information easily and efficiently.

SUMMARY OF THE INVENTION

Accordingly, an object of the present invention is to provide a user even at a place away from a racecourse with computer graphic horses having existing past data therein, and is to drastically improve a hitting ratio of finishing orders calculated before races by simultaneously giving real time data to a user or by adding data created by himself or herself.

Moreover, another object of the present invention is to provide a system capable of transferring a predicted finishing order to a mobile communication system of a user and/or to a system having a function of a communication terminal.

Therefore, one feature of the present invention is to comprise real racing horses, graphic horses substantially the same as the real racing horses, and a real racecourse, to display on a display screen, said real racing horses and said graphic racing horses substantially the same as said real racing horses as a real horse race by the real racing horses takes place, and, additionally, to retrieve weighted existing past data relating to the above-mentioned graphic horses into the graphic horses.

Another feature of the present invention is to retrieve real time data as well as the weighted existing past data relating to the graphic horses into the same horses.

Another feature of the present invention is to retrieve data created by a user as well as the weighted existing past data and the real time data.

As to the existing past data, weighting is to be given to data such as earnings, race results, post positions, trainers, winning percentages, weights with which horses are saddled, ages, training results, workout results, types of horses and the like. Also, upon predicting a horserace, a greater weight should be given to data such as wind direction and wind force just before a race as they are important factors, while data such as cheers of attendants is considered less important, except for certain cases. A predicted finishing order is calculated with the weighted data, with a higher probability.

As to the real-time data, weighting is given to data, which can be acquired just before a race, such as wind direction, wind force, weather, information on a racetrack, and so-called paddock information including training results, physical conditions, mood, cheers of attendants, changes of jockeys, and the like. Also, as to the data created by a user, weighting is given to data such as ages, sexes, types of horses, weights of horses, speed and stamina figures, forms, tempers, horses' aptitudes for a race distance, a track surface and a racecourse, trainers, colors of horses, and the like. A predicted finishing order is calculated with the weighted data, with a higher probability.

As another feature of the present invention, a system of the present invention comprises a host computer into which at least horses to start a real horse race are inputted, a graphic system for changing the horses to graphic horses, a data server which stores existing past data associated with the horses, a data server which stores real-time data associated with the horses, a data server which stores data created by a user associated with the horses, and a program for performing the horseracing contest, and the program performs the steps of changing the horses to start the horse race to graphic horses, retrieving data from each of the servers, and giving the data to the graphic horses, and by starting the program, a virtual horserace is performed, and a result of the real horserace is predicted, or after the performance of the program, a result that is different from a result of the real horse race is displayed with use of existing past data, real-time data and data created by the user.

Thus calculated finishing order can be displayed in a manner that real horses and graphic horses are displayed on one display screen, or can be displayed as text information, or can be transferred to a mobile communication system or a system having a function of a communication terminal as voice information, according to the feature of the present invention.

BRIEF DESCRIPTION OF THE DRAWINGS

FIG. 5 is a view of an example of workout results information;

FIG. 6 is a view of an example of training results information;

FIG. 9 is a view of a first example of data to be outputted;

FIG. 12 is a view of a fourth example of data to be outputted;

DESCRPTION OF THE PREFERRED EMBODIMENTS (First Embodiment)

Figure 1:
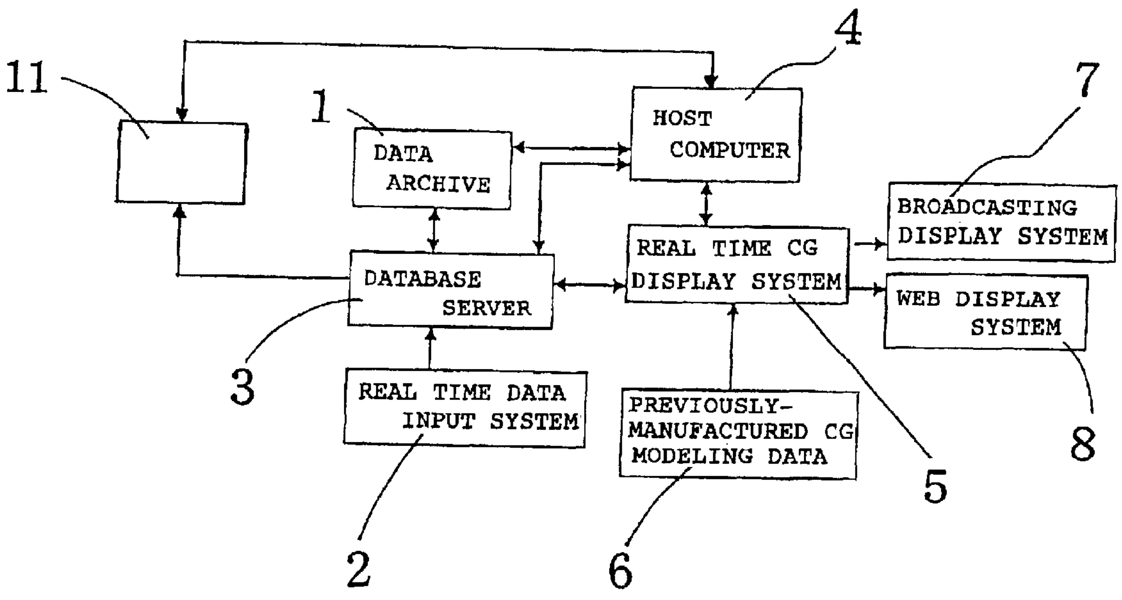
FIG. 1 is a block diagram of the whole system according to the present invention.
Figure 7:
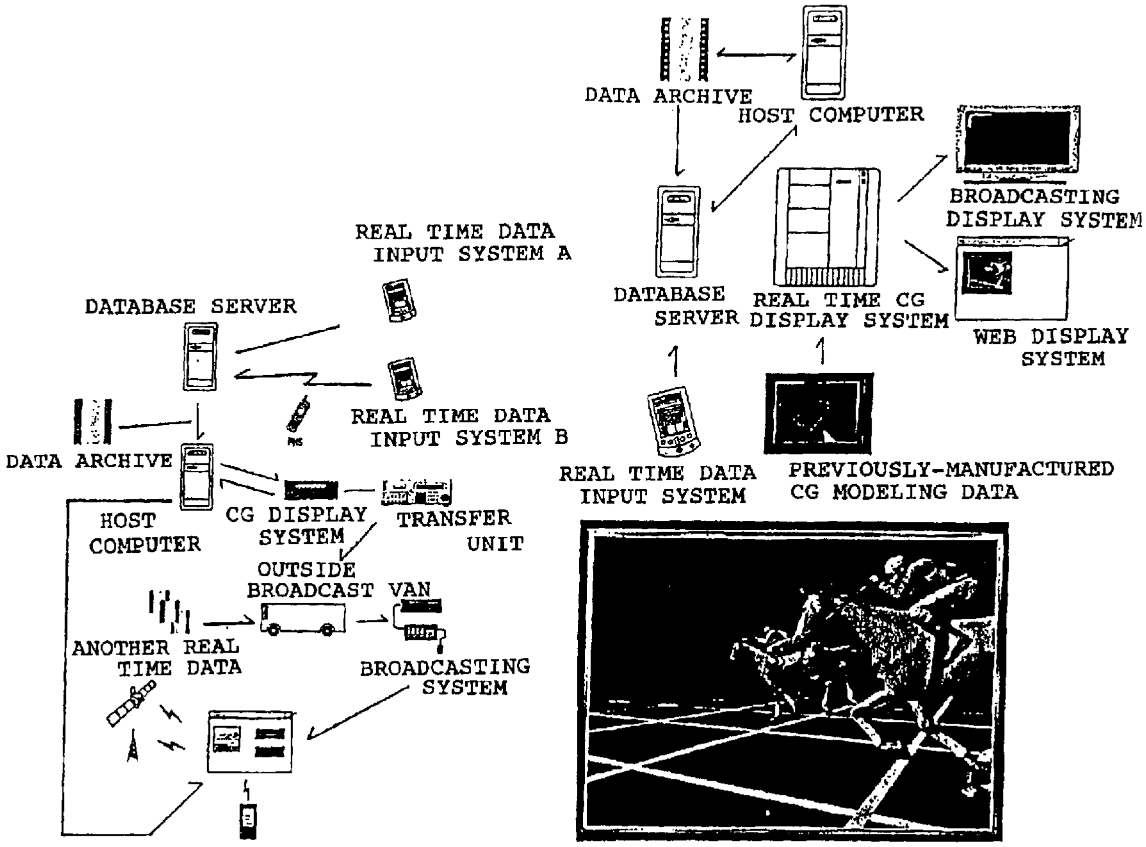
FIG. 7 is a view of a first image of the whole system according to the present invention.
Figure 8:
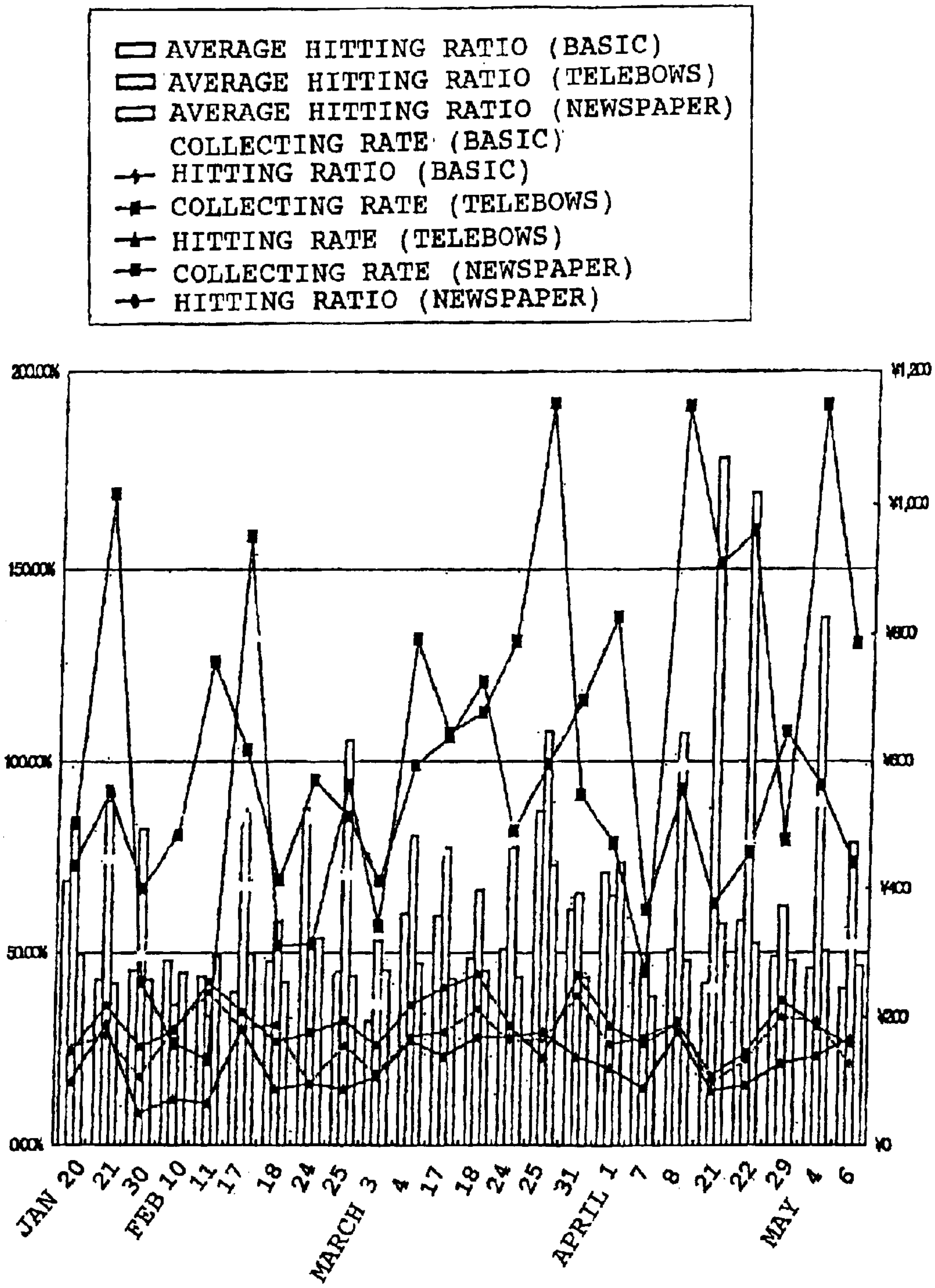
FIG. 8 is a comparison view between the system of the present invention and a conventional system.

At first, the whole structure of the system of the present invention will be explained using FIG. 1 and FIG. 7.

Figure 4:
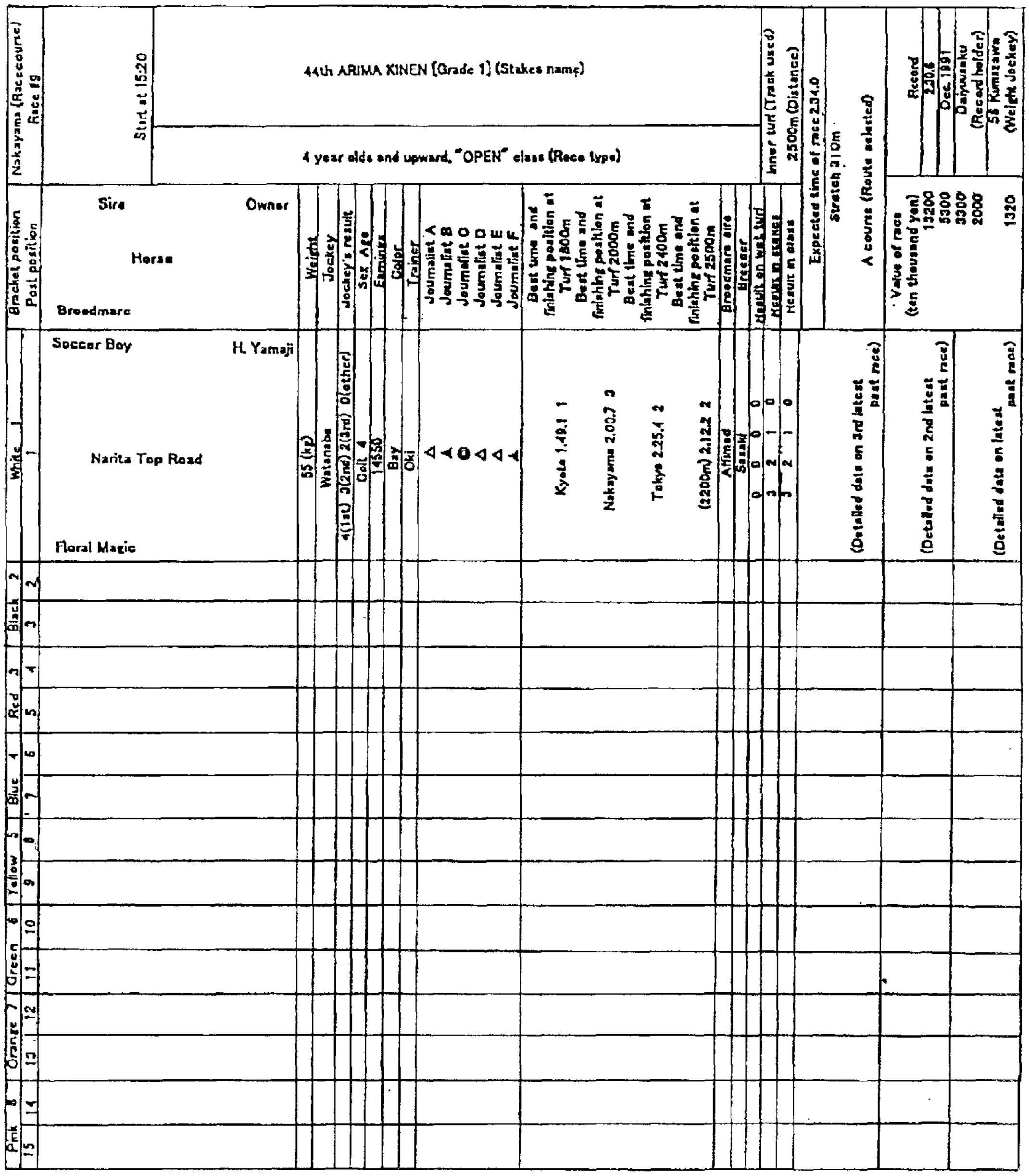
FIG. 4 is a list of starting horses of a horserace.

In the drawings, numeral 1 indicates a data archive input system for inputting existing past data including various horseracing data which can be obtained from e.g. newspapers or the like, as shown in FIGS. 4 and 5.

Numeral 2 indicates a real-time data input system. Data to be inputted is real-time data, which becomes available just before a race, and which can be obtained e.g. near a paddock of a racecourse. Namely, for example, with use of a mobile computer terminal, at least more than twenty items of information including wind force, weather, racetrack condition, paddock information including training results, physical conditions, mood, cheers of attendants, changes of jockeys, etc. can be inputted into the real-time data input system.

Numeral 11 indicates an input system for data created by a user, hereinafter referred to as user created data. The user created data is created arbitrarily by a user. Namely, for example, with use of a mobile computer terminal, at least more than twenty items of information including ages, sexes, types of horses, weights of horses, speed and stamina figures, forms, tempers, horses' aptitudes for a race distance, a track surface and a racecourse, trainers, colors of horses, etc. can be inputted into the user created data input system.

Thus inputted data is transferred to a database server 3 in a base station provided in a predetermined location, via mobile telephone communication lines, ISDN lines, wireless or fixed-line LAN or the Internet. The user created data is also transferred in the same manner.

More specifically, the database server 3 detects data on starting horses from the data archive input system 1, according to an instruction from a location [usually, a host computer 4] where data on races held in that day is stored, and retrieves data from the real time data input system 2 and the user created data input system 11.

In the host computer 4, predetermined weights are given to the data. Namely, upon predicting a race, wind direction, wind force and weather condition, which becomes available just before the race, are considered relatively important among the real-time data, therefore greater weights are given to such data. On the other hand, only a smaller weight is given to cheers of attendants. The weighted real time data and weighted existing past data are combined with the user created data, and the combined data will be calculated by the host computer 4.

Numeral 5 in the drawings indicates a real time computer graphic display system, which creates in advance graphic horses using modeling data 6. Details of the real time computer graphic display system 5 will be described later.

Upon displaying graphic horses, it is important to display the number of each starting horse, and the cloth and helmet of each jockey in the same number, design and color as each real horse starting the race. It is also preferable that visual information such as the size (e.g. large horse, small horse, or the like) and color (e.g. bay, gray, or the like) of each starting horse can be also processed by means of computer graphics.

Numeral 7 indicates a broadcasting display system, and Numeral 8 indicates a Web display system. For a user having a contract, the real horses and graphic horses are displayed on a display screen on a real time basis, or a predicted finishing order of the race is provided as text information on a display screen or as voice information.

(Second Embodiment)

A method of predicting a finishing order of a horserace is described, as follows. Data that is available from newspapers includes post positions, horse numbers, marks, names of horses, sexes, ages, weights with which horses are saddled, jockeys, earnings, workout results, and the like. Such data has been stored in the data archive input system 1, so the data is retrieved from the database server 3 according to an instruction from the host computer 4.

Simultaneously, a data collecting staff member e.g. situated at a paddock of a racecourse inputs various types of data including wind direction, wind force, weather condition, racetrack condition and paddock information including training results of horses, physical conditions of horses, moods of horses, cheers of attendants and changes of jockeys, and also inputs information on trainers, owners and the like that a user has obtained in his or her own way, through the real time input system 2, and then transfers the above-mentioned data to the database server 3 via mobile telephone communication lines, ISDN lines, wireless or fixed-line LAN or the Internet.

Figure 10:
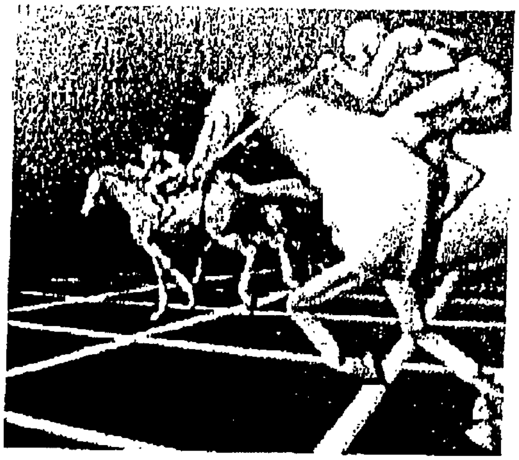
FIG. 10 is a view of a second example of data to be outputted.
Figure 11:
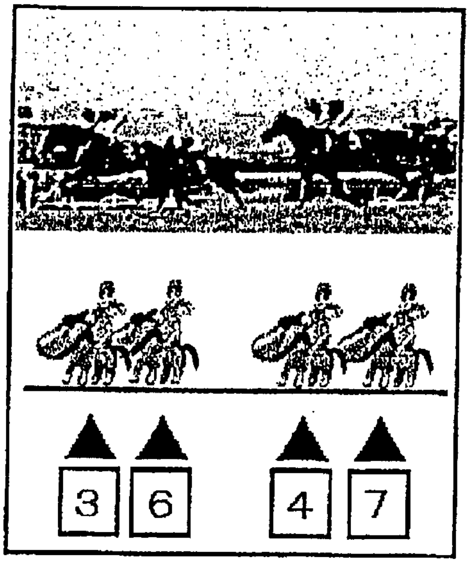
FIG. 11 is a view of a third example of data to be outputted.

The computer graphic display system 5 creates in advance, by using the modeling data 6 for all starting horses, graphic horses which are substantially the same as real horses and expressed by means of computer graphics, as shown in FIG. 10. In this case, it is important to display the number of each graphic horse, and the cloth and helmet of each jockey in the same number, design and color as each real horse starting the race.

A user who would like to use this finishing order prediction simulation system has to make a contract in advance. Only a user under the contract is allowed to use the finishing order prediction simulation system, and is allowed to use the broadcasting display system 7 and/or the Web display system 8.

Upon implementing the present invention, a packet communication system is used as one example of a system delivering such information.

Figure 2:
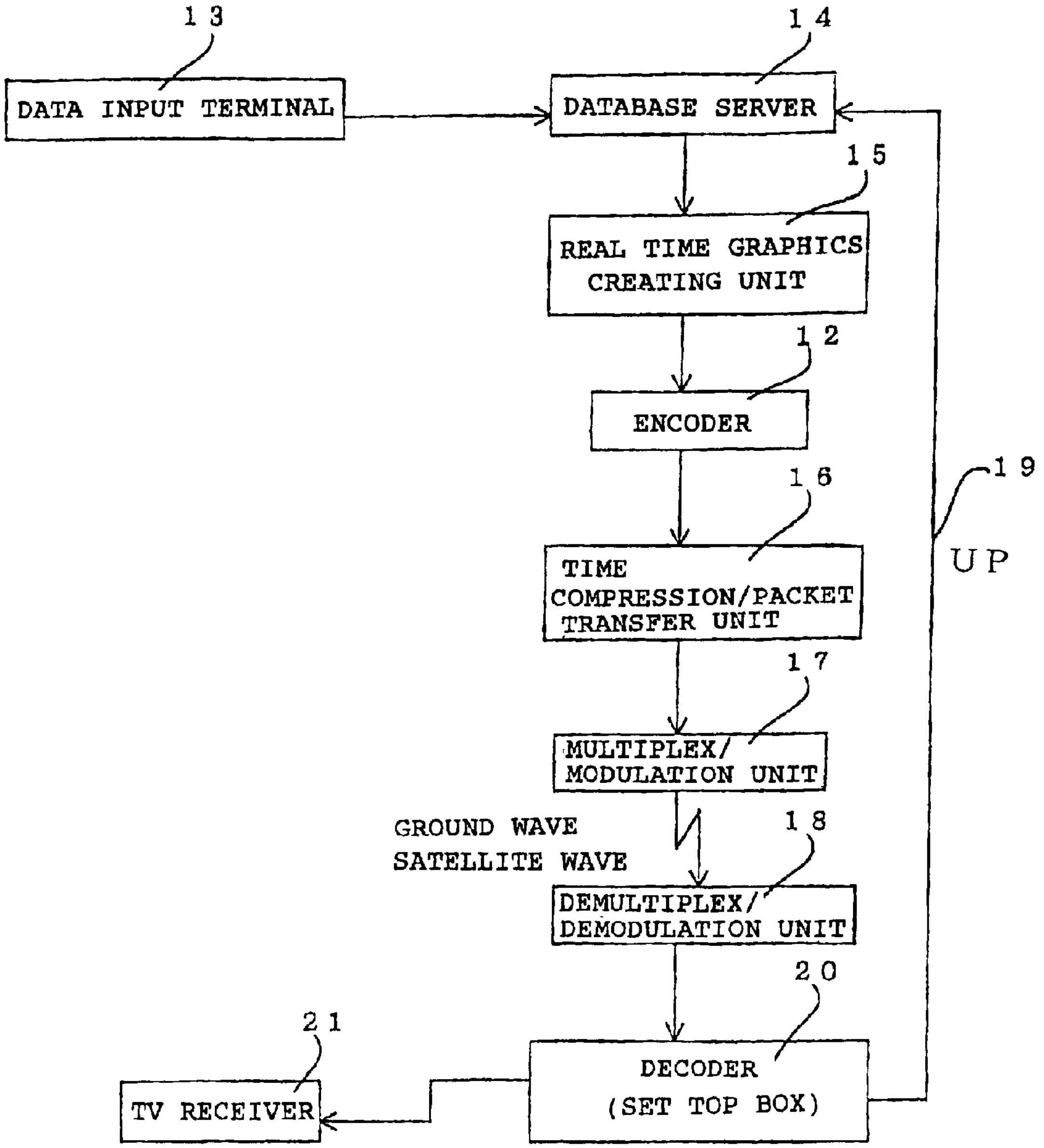
FIG. 2 is a view of an example of a broadcasting system.
Figure 3:
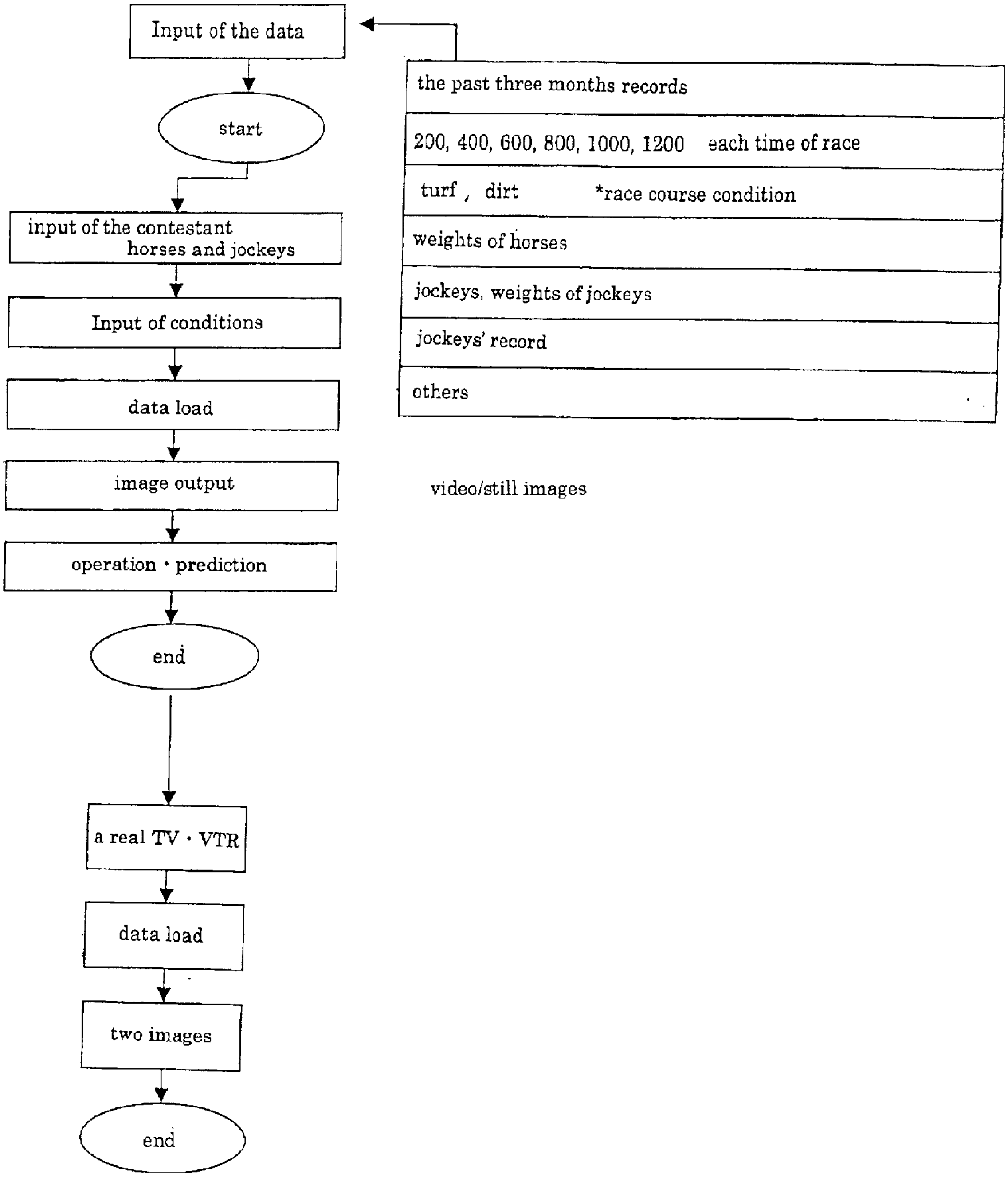
FIG. 3 is a flow chart showing the flow of an operation according to the present invention.

FIG. 2 is a view of one example of a digital transmission system, which comprises an encoder 12 into which at least digital video and voice information is inputted, a data input terminal 13 for digitalizing data on real time basis, a database server 14 into which the data from the data input terminal 13 are inputted and which stores digitalized data of other additional information, a real time graphics creating unit 15 which creates real time graphics upon receipt of desired data from the database server 14 and which outputs the digital data to the encoder 12, a time compression/packet transmission unit 16 which performs time compression and packet transmission upon receipt of the output from the encoder 12, a multiplex/modulation unit 17 which performs multiplexing and modulating of the output from the time compression/packet transfer unit 16 and which transmits a result of the multiplexing and modulating in a form of ground wave or satellite wave, a demultiplex/demodulation unit 18 which performs demultiplexing and demodulating data signals in a form of ground wave or satellite wave upon receipt of the data signals from the multiplex/modulation unit 17, a decoder (e.g. a set top box) 20 into which the output from the demultiplex/demodulating unit 18 is inputted and which has a line (e.g. a telephone line) 19 connected to the database server 14, and a television receiver connected to the decoder 20. However, an information delivering system is not restricted to such a structure, and information may be provided via mobile telephone communication lines, ISDN lines, wireless or fixed-line LAN or the Internet.

(Third Embodiment)

When a user would like to simulate a result, i.e. a finishing order, of a desired race, the user clicks the race (not shown here), just before starting the race, namely just before betting of the race is closed. Then, the real horses starting the race and the graphic horses substantially the same as the real horses are displayed on a display screen as the race takes place.

Since data for types of the horses, e.g. a horse which would lead the race, a horse which would travel the race behind other horses, or the like, is also stored in the data archive input system 1, the action of the race of computer graphics, i.e. simulation, is the same as the action of the real race.

A simulation of a race using the existing past data stored in the data archive input system 1 was explained above, but a simulation of a race can be performed using the real time data or the user created data.

Each data is read out from each server to be processed into graphics, and then a virtual horse race can be performed by displaying the graphic horses having each data, as illustrated in FIG. 9 and FIG. 12.

Alternatively, it is possible to display a result different from a result of the real horserace by using the existing past data, the real time data and the user created data. It satisfies a user who thinks, for example, “If that horse had run the race, the race would not have ended in this result.” or “What if that legendary horse should start the race with these horses?” More specifically, a user arbitrarily inputs data such as ages, sexes, types of horses, weights of horses, speed and stamina figures, forms, tempers, horses’ aptitudes for a race distance, a track surface and a racecourse, trainers, colors of horses or the like, through a mobile computer terminal. Thereafter, the virtual horserace is performed in the same manner, and a result of the virtual race, which is different from that of the real race, can be displayed.

(Fourth Embodiment)

Figure 16:
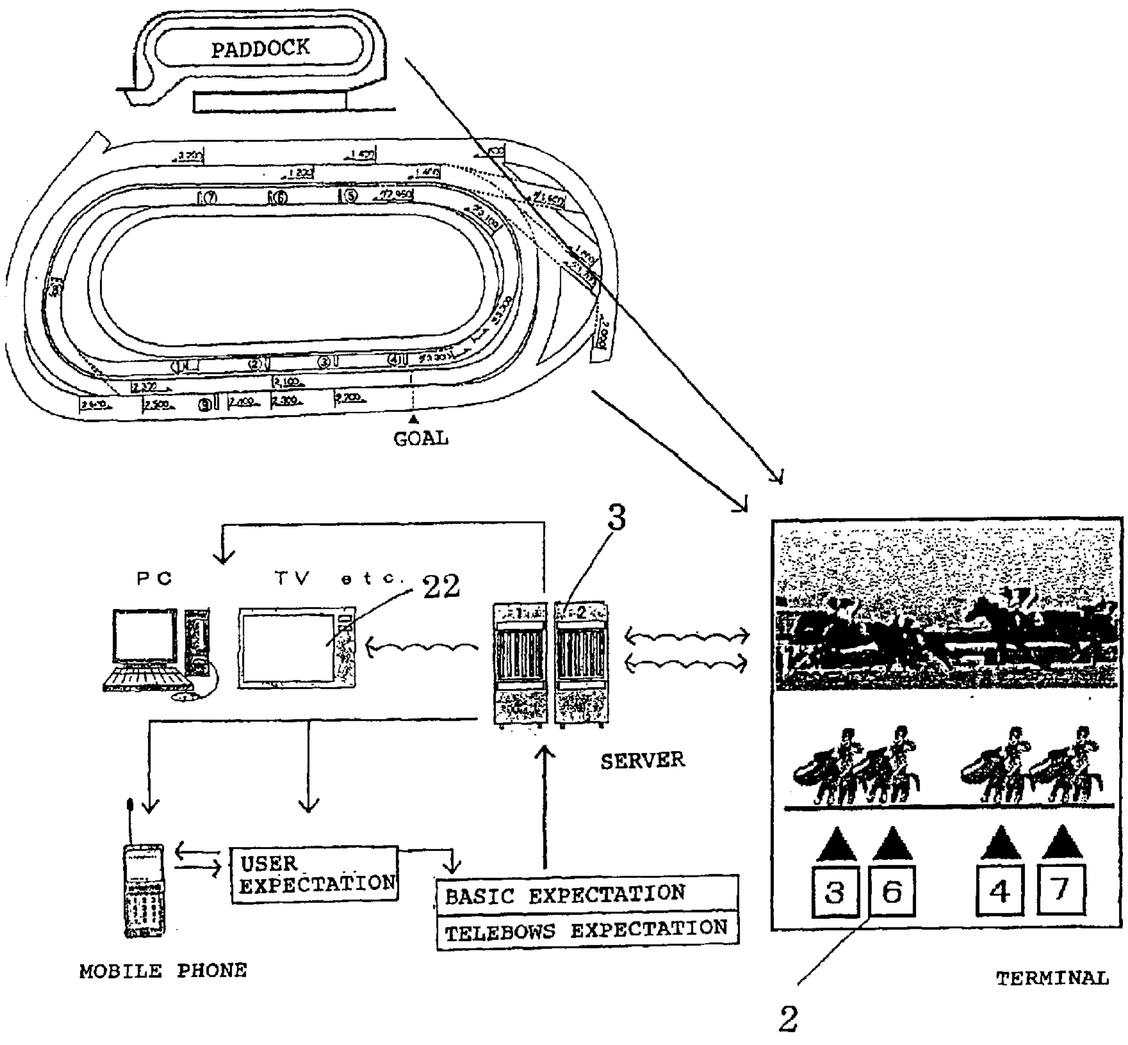
FIG. 16 is a view of a second image of the whole system according to the present invention.
Figure 17:
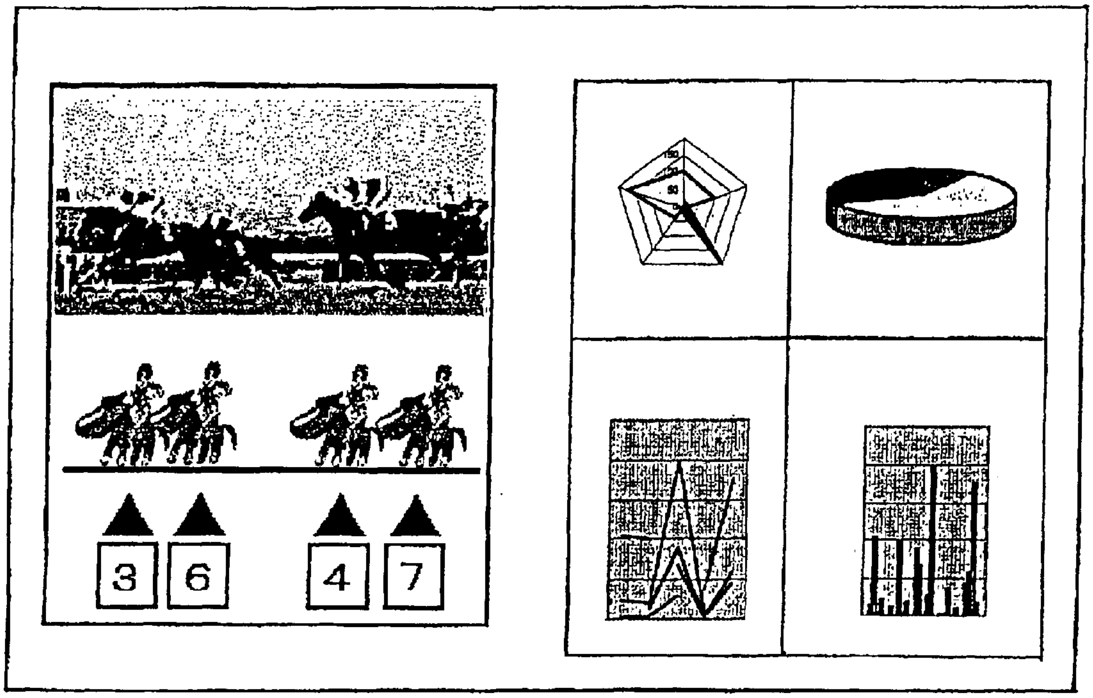
FIG. 17 is a view of an eighth example of data to be outputted.

Thus calculated result can be displayed with video images of the real race on a display screen, or displayed on a screen as text information, or can be transferred as voice information to a user’s mobile communication system or a system having a function of a communication terminal. The system is described by using FIG. 16. The video images of the real race is brought into a receiver, i.e. a television receiver 22, through a satellite wave or ground wave channel, while the data from the real time data input system 2 is compounded, by a mix system 21, with the graphic images created in advance as mentioned above, and both images are displayed on a screen of the television receiver 22 in parallel by the broadcasting display system 7, not overlapping with each other. Also, with use of the Web display system, the images are transferred to and displayed on a user’s mobile communication system or a system having a function of a communication terminal.

This information providing method is shown in FIG. 10, FIGS. 13 through 15, and FIG. 17. When a real race taking place is displayed on a screen of e.g. a television receiver, the real race and the virtual race including graphic horses with a finishing order having been simulated are displayed in parallel without overlapping with one another, which is very interesting to a user.

Figure 13:
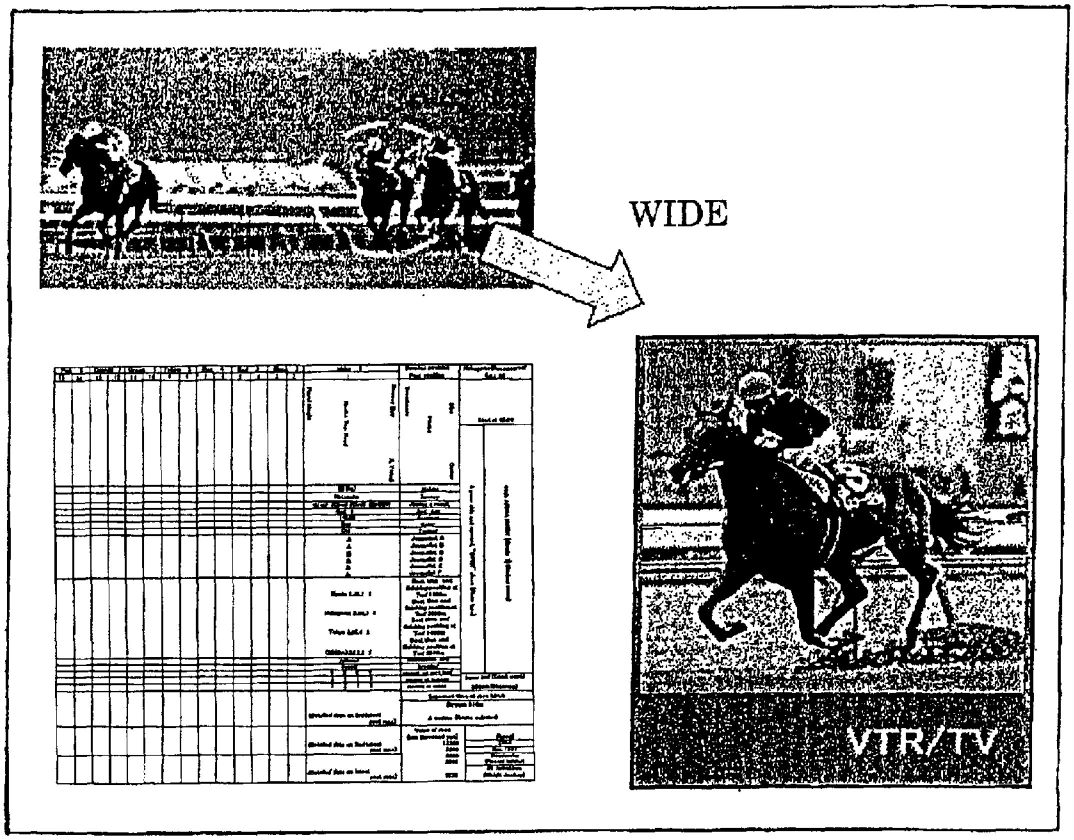
FIG. 13 is a view of a fifth example of data to be outputted.

As illustrated in FIG. 13, it is possible that a portion is enlarged as a user desires, or that a list of starting horses of a race is displayed on a display screen.

Figure 14:
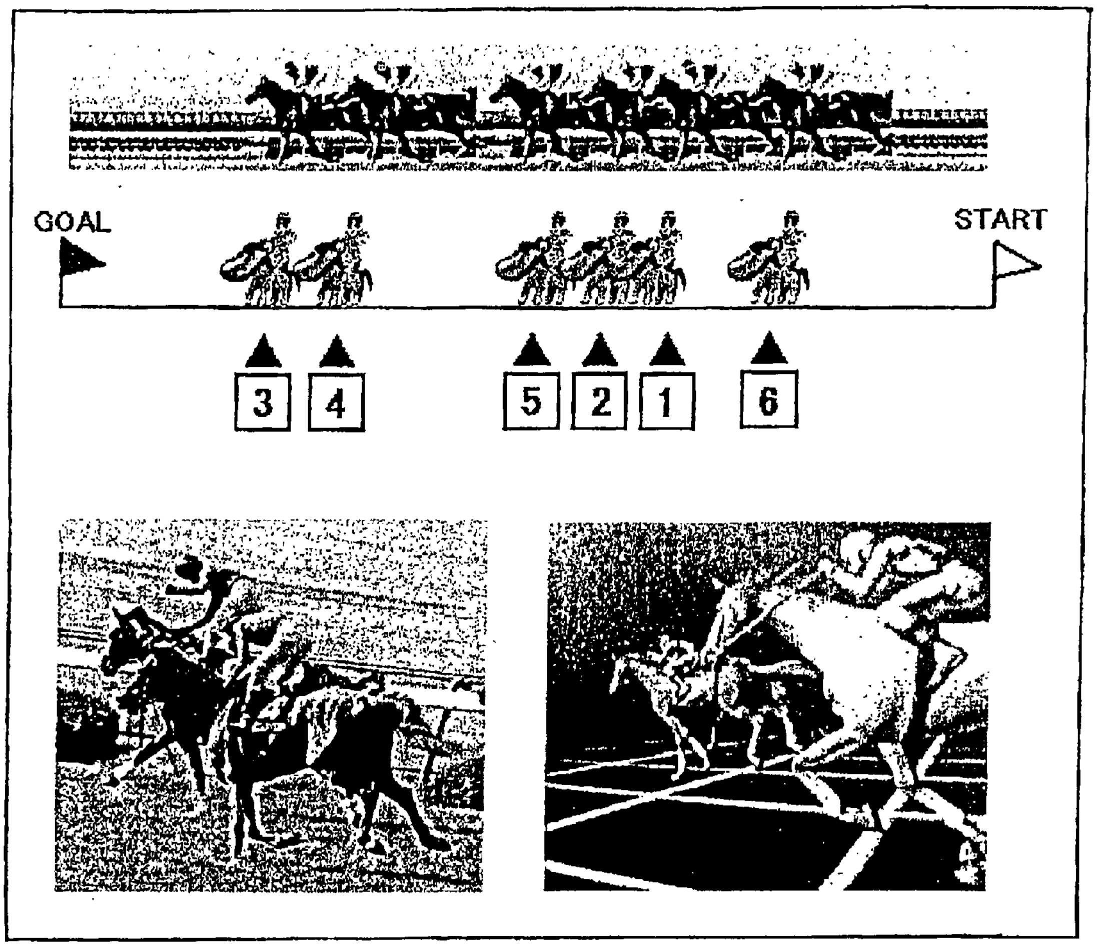
FIG. 14 is a view of a sixth example of data to be outputted.
Figure 15:
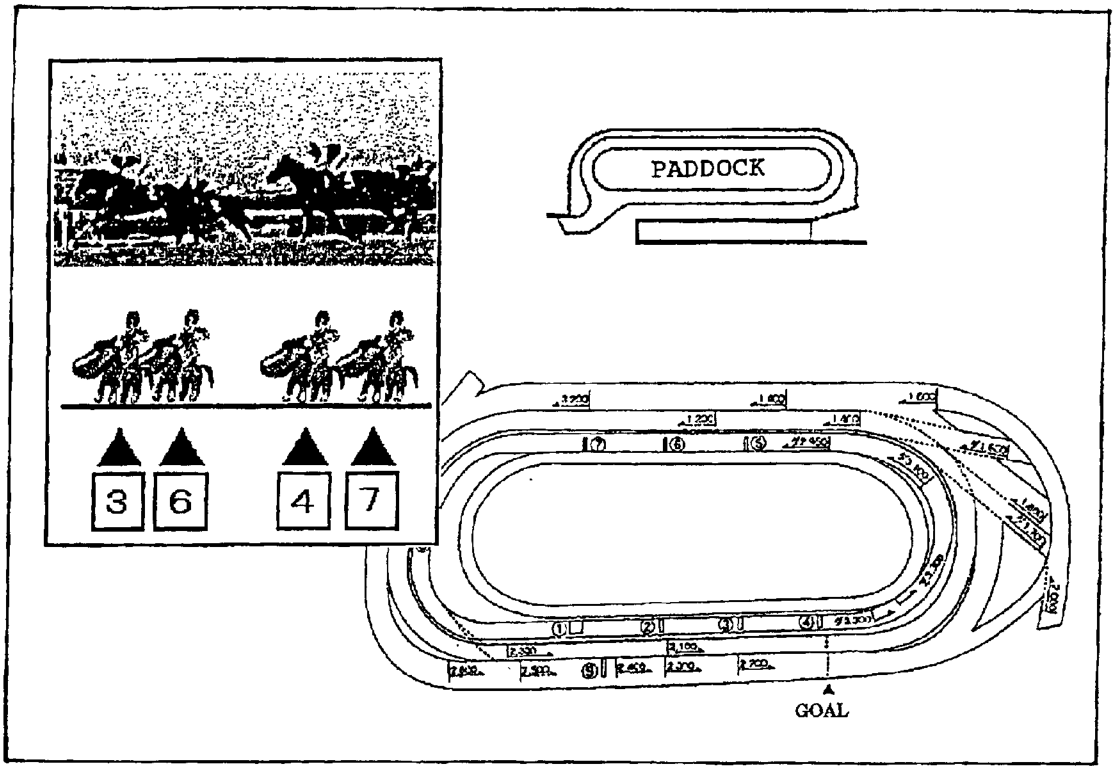
FIG. 15 is a view of a seventh example of data to be outputted.

Furthermore, FIG. 14 is a view showing video images of real horses, simulated graphic horses, video images of a real race, and graphic images thereof, separately. FIG. 15 is a view of an example for a screen displaying a rough sketch of a racecourse and a paddock together with the output of the simulation. Thus, several kinds of information can be provided to a user simultaneously.

As set forth hereinabove, even if a user is at a place away from a racecourse, graphic horses having existing past data and real time data are both provided to a user at the same time, and the user can add data created by himself or herself when necessary, and thereby the user can predict a finishing order of a horserace with a drastically improved hitting probability.

What is claimed is:

1. A virtual horseracing system, comprising real racing horses, graphic racing horses that are substantially the same as and correspond to the real racing horses and are drawn by computer graphics, and a real racecourse, wherein the real racing horses and the graphic racing horses are displayed in real-time on a display screen as the real horserace takes place, wherein at least real time data on the real racing horses is retrieved into the corresponding graphic racing horses to predict a finishing order of the real horserace before the real horserace actually finishes.

2. A virtual horseracing system according to claim 1, wherein existing past data, each of which is weighted, relating to the real racing horses is retrieved into the graphic racing horses.

3. A virtual horseracing system according to claim 2, wherein data created by a user is retrieved into the graphic racing horses.

4. A virtual horseracing system according to claim 2, wherein the existing past data includes at least one or more items of data selected from a group consisting of earnings, race results, post positions, trainers, winning percentages, weights with which horses are saddled, ages, training results, workout results, types of horses and the like, each of which is weighted.

5. A virtual horseracing system according to claim 4, wherein the real time data includes at least one or more items of data selected from a group consisting of wind direction, wind force, weather condition, racetrack condition and paddock information including training results, physical conditions, moods, cheers of attendants, changes of jockeys and the like, each of which is weighted.

6. A virtual horseracing system according to claim 1, wherein data created by a user is retrieved in to the graphic racing horses.

7. A virtual horseracing system according to claim 6, wherein the data created by a user includes at least one or more items of data selected from a group consisting of ages, sexes, types of horses, weights of horses, speed and stamina figures, forms, tempers, horses’ aptitudes for a race distance, a track surface and a racecourse, trainers, colors of horses and the like, each of which is weighted.

8. A virtual horseracing system according to claim 7, comprising:

a host computer into which at least data on a plurality of horses to start a real horse race are inputted, a graphic system which changes the horses to graphic horses, a data server which stores the existing past data associated with the horses, a data server which stores the real time data associated with the horses, a data server which stores the data created by a user associated with the horses, and a program which performs a horseracing contest, of which the performance comprising the steps of:

changing the horses to start the horse race to the graphic horses, retrieving data from each of the servers, and giving the data to the graphic horses, wherein by starting the program, a virtual horse race is performed, and consequently the finishing order of the real horse race is simulated.

9. A virtual horseracing system according to claim 8, wherein the real racing horses and the graphic racing horses are displayed on a display screen thereby displaying the simulated finishing order of the real horse race.

10. A virtual horse racing system according to claim 8, wherein the simulated finishing order of the real horse race is displayed on a display screen as text information.

11. A virtual horse racing system according to claim 8, wherein the simulated finishing order of the real horse race is transferred as voice information.

12. A virtual horseracing system according to claim 8, wherein the simulated finishing order or the simulated result is transferred to at least one of a mobile communication system and a system having a function of a communication terminal.

13. A virtual horseracing system according to claim 6, comprising:

a host computer into which at least data on a plurality of horses to start a real horse race are inputted, a graphic system which changes the horses to graphic horses, a data server which stores the existing past data associated with the horses, a data server which stores the real time data associated with the horses, a data server which stores the data created by a user associated with the horses, and a program which performs a horseracing contest, of which the performance comprising the steps of:

changing the horses to start the horse race to the graphic horses, retrieving data from each of the servers, and giving the data to the graphic horses, whereby starting the program, a virtual horse race is performed, and consequently the finishing order of the real horse race is simulated.

14. A virtual horseracing system according to claim 13, wherein the real racing horses and the graphic racing horses are displayed on a display screen thereby displaying the simulated finishing order of the real horse race.

15. A virtual horse racing system according to claim 13, wherein the simulated finishing order of the real horse race is displayed on a display screen as text information.

16. A virtual horse racing system according to claim 13, wherein the simulated finishing order of the real horse race is transferred as voice information.

17. A virtual horseracing system according to claim 13, wherein the data created by a user includes at least one or more items of data selected from a group consisting of ages, sexes, types of horses, weights of horses, speed and stamina figures, forms, tempers, horses' aptitudes for a race distance, a track surface and a racecourse, trainers, colors of horses and the like, each of which is weighted.

18. A virtual horseracing system according to claim 13, wherein after the performance of the program, a simulated result that is different from an actual result of the real horse race is displayed, wherein the simulated finishing order or the simulated result is transferred to at least one of a mobile communication system and a system having a function of a communication terminal.

19. A virtual horseracing system according to claim 6, wherein the existing past data includes at least one or more items of data selected from a group consisting of earnings, race results post positions, trainers, winning percentages, weights with which horses are saddled, ages, training results, workout results, types of horses and the like, each of which is weighted.

20. A virtual horseracing system according to claim 6, comprising:

a host computer into which at least a plurality of horses to start a real horse race are inputted, a graphic system which changes the horses to the graphic horses, a data server which stores the existing past data associated with the horses, a data server which stores the real time data associated with the horses, a data server which stores the data created by a user associated with the horses, and a program which performs a horseracing contest, of which the performance comprising the steps of:

changing the horses to start the horse race to the graphic horses, retrieving data from each of the servers, and giving the data to the graphic horses, wherein after the performance of the program, a simulated result by the program that is different from an actual result of the real horse race is displayed.

21. A virtual horse racing system according to claim 20, wherein the real racing horses and the graphic racing horses are displayed on a display screen.

22. A virtual horse racing system according to claim 20, wherein the simulated result different from the actual result of the real horse race is displayed on a display screen as text information.

23. A virtual horse racing system according to claim 20, wherein the simulated result different from the actual result of the real horse race is transferred as voice data.

24. A virtual horseracing system according to claim 20, wherein the simulated finishing order or the simulated result is transferred to at least one of a mobile communication system and a system having a function of a communication terminal.

25. A virtual horseracing system according to claim 1, wherein the real time data includes at least one or more items of data selected from a group consisting of wind direction, wind force, weather condition, racetrack condition and paddock information including training results, physical conditions, moods, cheers of attendants, changes of jockeys and the like, each of which is weighted.

26. A virtual horseracing system according to claim 25, further comprising:

a host computer into which at least data on a plurality of horses to start a real horse race are inputted, a graphic system which changes the horses to graphic horses, a data server which stores the existing past data associated with the horses, a data server which stores the real time data associated with the horses, a data server which stores the data created by a user associated with the horses, and a program which performs a horseracing contest, of which the performance comprising the steps of:

changing the horses to start the horse race to the graphic horses, retrieving data from each of the servers, and giving the data to the graphic horses, wherein by starting the program, a virtual horse race is performed, and consequently the finishing order of the real horse race is simulated.

27. A virtual horse racing system according to claim 26, wherein the real racing horses and the graphic racing horses are displayed on a display screen.

28. A virtual horse racing system according to claim 26, wherein after the performance of the program, a simulated result by the program that is different from an actual result of the real horse race is displayed.

29. A virtual horse racing system according to claim 28, wherein the simulated result different from the result of the real horse race is transferred as voice data.

30. A virtual horseracing system according to claim 28, wherein the simulated finishing order or the simulated result is transferred to at least one of a mobile communication system and a system having a function of a communication terminal.

* * * * *